(12) United States Patent
Bussat et al.

(10) Patent No.: US 9,116,254 B2
(45) Date of Patent: Aug. 25, 2015

(54) METHOD OF AND APPARATUS FOR EXPLORING A REGION BELOW A SURFACE OF THE EARTH

(75) Inventors: Sascha Bussat, Bergen (NO); Peter Hanssen, Bergen (NO); Simone Patricia Kugler, Bergen (NO)

(73) Assignee: Statoil Petroleum AS, Stavanger (NO)

( * ) Notice: Subject to any disclaimer, the term of this patent is extended or adjusted under 35 U.S.C. 154(b) by 1042 days.

(21) Appl. No.: 12/809,335

(22) PCT Filed: Dec. 22, 2008

(86) PCT No.: PCT/GB2008/004243
§ 371 (c)(1),
(2), (4) Date: Dec. 15, 2010

(87) PCT Pub. No.: WO2009/081150
PCT Pub. Date: Jul. 2, 2009

(65) Prior Publication Data
US 2011/0085420 A1 Apr. 14, 2011

(30) Foreign Application Priority Data
Dec. 20, 2007 (GB) .................................. 0724847.9

(51) Int. Cl.
*G01V 1/28* (2006.01)
(52) U.S. Cl.
CPC .......... *G01V 1/28* (2013.01); *G01V 2210/1236* (2013.01)
(58) Field of Classification Search
CPC .................... G01V 1/28; G01V 2210/1236
See application file for complete search history.

(56) References Cited

U.S. PATENT DOCUMENTS

| 3,275,097 A | 9/1966 | Pavey, Jr. |
| 3,590,919 A | 7/1971 | Talley, Jr. |
| 4,378,848 A | 4/1983 | Milberger |
| 4,547,869 A | 10/1985 | Savit |
| 4,576,479 A | 3/1986 | Downs |
| 4,583,095 A | 4/1986 | Peterson |

(Continued)

FOREIGN PATENT DOCUMENTS

| DE | 4004228 | 8/1991 |
| EP | 0018053 | 4/1980 |

(Continued)

OTHER PUBLICATIONS

Bensen, Geophys. J Int. 2007, 169, 1239-1260.*

(Continued)

*Primary Examiner* — Luke Ratcliffe
*Assistant Examiner* — Hovhannes Baghdasaryan
(74) *Attorney, Agent, or Firm* — Patterson Thuente Pedersen, P.A.

(57) ABSTRACT

A passive method for exploring a region below the surface of the earth. The method comprises using a single sensor located in turn at a plurality of locations to obtain seismic data obtained by recording ambient seismic interface waves in a frequency range whose lower limit is greater than 0 Hz, and whose upper limit is less than or equal to substantially 1 Hz. The data are processed so as to obtain a measure of the energy in a frequency band within the frequency range. For example, the seismic data may be filtered and may be subjected to amplitude normalization before being transformed into the frequency domain. The energy measure may then be calculated by integrating the spectrum in the frequency domain over a desired frequency range. The resulting calculated energy provides information about the region of the earth being explored.

28 Claims, 5 Drawing Sheets

(56) References Cited

U.S. PATENT DOCUMENTS

| | | |
|---|---|---|
| 4,603,407 A | 7/1986 | Cowles |
| 4,843,597 A | 6/1989 | Gjessing et al. |
| 4,862,422 A | 8/1989 | Brac |
| 4,909,671 A | 3/1990 | Skjong |
| 4,942,557 A | 7/1990 | Seriff |
| 4,992,995 A | 2/1991 | Favret |
| 5,029,023 A | 7/1991 | Bearden et al. |
| 5,070,483 A | 12/1991 | Berni |
| 5,109,362 A | 4/1992 | Berni |
| 5,144,588 A | 9/1992 | Johnston et al. |
| 5,159,406 A | 10/1992 | Adler et al. |
| 5,317,383 A | 5/1994 | Berni |
| 5,444,619 A | 8/1995 | Hoskins |
| 5,477,324 A | 12/1995 | Berthelot et al. |
| 5,570,321 A | 10/1996 | Bernitsas |
| 5,671,136 A | 9/1997 | Willhoit, Jr. |
| 5,724,309 A | 3/1998 | Higgs |
| 5,892,732 A | 4/1999 | Gersztenkorn et al. |
| 5,940,777 A | 8/1999 | Keskes |
| 5,987,388 A | 11/1999 | Crawford et al. |
| 6,011,557 A | 1/2000 | Keskes et al. |
| 6,011,753 A | 1/2000 | Chien |
| 6,026,057 A | 2/2000 | Byun et al. |
| 6,028,817 A | 2/2000 | Ambs |
| 6,049,760 A | 4/2000 | Scott |
| 6,081,481 A | 6/2000 | Sabatier et al. |
| 6,134,966 A | 10/2000 | Donskoy et al. |
| 6,141,440 A | 10/2000 | Melen |
| 6,301,193 B1 | 10/2001 | Martin et al. |
| 6,420,976 B1 | 7/2002 | Baggs et al. |
| 6,456,565 B1 | 9/2002 | Grall et al. |
| 6,473,695 B1 | 10/2002 | Chutov et al. |
| 6,536,528 B1 | 3/2003 | Amin et al. |
| 6,735,526 B1 | 5/2004 | Meldahl et al. |
| 6,739,165 B1 | 5/2004 | Strack |
| 6,752,214 B2 | 6/2004 | Amin et al. |
| 6,787,758 B2 | 9/2004 | Tubel et al. |
| 6,788,618 B2 | 9/2004 | Clayton et al. |
| 6,873,571 B2 | 3/2005 | Clayton et al. |
| 7,011,152 B2 | 3/2006 | Soelvik |
| 7,032,658 B2 | 4/2006 | Chitwood et al. |
| 7,065,449 B2 | 6/2006 | Brewster et al. |
| 7,068,568 B2 | 6/2006 | Robertsson |
| 7,137,451 B2 | 11/2006 | Smith |
| 7,261,162 B2 | 8/2007 | Deans et al. |
| 7,311,151 B2 | 12/2007 | Chitwood et al. |
| 7,386,397 B2 | 6/2008 | Amundsen et al. |
| 7,463,549 B2 | 12/2008 | Naess |
| 7,530,398 B2 | 5/2009 | Balkanyi et al. |
| 7,660,188 B2 | 2/2010 | Meldahl |
| 7,715,988 B2 | 5/2010 | Robertsson et al. |
| 7,720,609 B2 | 5/2010 | Meldahl |
| 7,721,807 B2 | 5/2010 | Stoisits et al. |
| 7,793,724 B2 | 9/2010 | Daniel et al. |
| 7,817,495 B2 | 10/2010 | Ozbek et al. |
| 7,918,283 B2 | 4/2011 | Balkanyi et al. |
| 7,931,090 B2 | 4/2011 | Smedstad et al. |
| 7,933,003 B2 | 4/2011 | Meldahl et al. |
| 7,958,938 B2 | 6/2011 | Crossley et al. |
| 7,992,632 B2 | 8/2011 | Bornes et al. |
| 8,033,336 B2 | 10/2011 | Benson |
| 8,089,390 B2 | 1/2012 | Jones et al. |
| 8,115,491 B2 | 2/2012 | Alumbaugh et al. |
| 8,212,410 B2 | 7/2012 | Biester et al. |
| 8,351,298 B2 | 1/2013 | De Kok et al. |
| 8,498,176 B2 | 7/2013 | Meldahl et al. |
| 8,757,270 B2 | 6/2014 | Stenevik |
| 2002/0126575 A1 | 9/2002 | Bittleston et al. |
| 2003/0060102 A1 | 3/2003 | Ambs |
| 2004/0015296 A1 | 1/2004 | Causse et al. |
| 2004/0022125 A1 | 2/2004 | Clayton et al. |
| 2004/0122593 A1* | 6/2004 | Haldorsen ............... 702/6 |
| 2004/0144543 A1 | 7/2004 | Appleford et al. |
| 2004/0228214 A1 | 11/2004 | Tulett |
| 2004/0262008 A1 | 12/2004 | Deans et al. |
| 2005/0068850 A1* | 3/2005 | Muyzert et al. ............ 367/38 |
| 2005/0152220 A1* | 7/2005 | Kritski et al. ............... 367/38 |
| 2005/0178556 A1 | 8/2005 | Appleford et al. |
| 2005/0209783 A1 | 9/2005 | Bittleston |
| 2005/0288862 A1 | 12/2005 | Rode et al. |
| 2006/0098529 A1 | 5/2006 | Anderson et al. |
| 2006/0153005 A1 | 7/2006 | Herwanger et al. |
| 2006/0175062 A1 | 8/2006 | Benson |
| 2006/0285435 A1 | 12/2006 | Robertsson et al. |
| 2006/0285437 A1 | 12/2006 | Sinha et al. |
| 2007/0075708 A1 | 4/2007 | Reddig et al. |
| 2007/0299614 A1* | 12/2007 | Dewarrat ................. 702/16 |
| 2008/0019215 A1 | 1/2008 | Robertsson et al. |
| 2008/0288173 A1* | 11/2008 | Saenger .................. 702/16 |
| 2009/0128800 A1 | 5/2009 | Meldahl et al. |
| 2009/0154291 A1* | 6/2009 | Ferber ..................... 367/38 |
| 2009/0204330 A1 | 8/2009 | Thomsen et al. |
| 2010/0128561 A1 | 5/2010 | Meldahl et al. |
| 2010/0133901 A1 | 6/2010 | Zhang et al. |
| 2010/0171501 A1 | 7/2010 | Alumbaugh et al. |
| 2010/0211323 A1 | 8/2010 | Ozdemir et al. |
| 2010/0252260 A1 | 10/2010 | Fowler et al. |
| 2010/0332139 A1 | 12/2010 | Bruun et al. |
| 2011/0046885 A1 | 2/2011 | Bussat et al. |
| 2011/0242935 A1 | 10/2011 | Amundsen et al. |
| 2011/0247825 A1 | 10/2011 | Batho et al. |
| 2011/0251728 A1 | 10/2011 | Batho et al. |
| 2011/0290497 A1 | 12/2011 | Stenevik |
| 2013/0231868 A1 | 9/2013 | Bruun et al. |
| 2014/0251632 A1 | 9/2014 | Stenevik |
| 2014/0334256 A1 | 11/2014 | Amundsen et al. |

FOREIGN PATENT DOCUMENTS

| | | |
|---|---|---|
| EP | 1316672 | 6/2003 |
| EP | 1403662 | 9/2003 |
| EP | 1879052 | 1/2008 |
| FR | 2765344 | 12/1998 |
| GB | 2001021 | 1/1979 |
| GB | 2299108 | 9/1996 |
| GB | 2331971 | 6/1999 |
| GB | 2331971 | 11/1999 |
| GB | 2342081 | 4/2000 |
| GB | 2347744 | 9/2000 |
| GB | 2364388 | 1/2002 |
| GB | 2410635 | 8/2005 |
| GB | 2416835 | 8/2006 |
| GB | 2454745 | 5/2009 |
| GB | 2460170 | 11/2009 |
| JP | 2005275540 | 10/2005 |
| RU | 2072534 | 1/1997 |
| RU | 2121133 | 10/1998 |
| RU | 2246122 | 2/2005 |
| RU | 2271554 | 3/2006 |
| SU | 9533 | 1/1900 |
| SU | 1728825 | 4/1992 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO02/072999 | 9/2002 |
| WO | WO 02/073241 | 9/2002 |
| WO | WO 2004/003589 | 1/2004 |
| WO | WO2004003339 | 1/2004 |
| WO | WO 2004/044617 | 5/2004 |
| WO | WO 2005/078479 | 8/2005 |
| WO | WO 2006/011826 A1 | 2/2006 |
| WO | WO 2007/141725 A2 | 12/2007 |
| WO | WO2009042319 | 4/2009 |

OTHER PUBLICATIONS

Hohl, Detlef, et al., "Passive Seismic Reflectivity Imaging with Ocean-Bottom Cable Data," *SEG/New Orleans 2006 Annual Meeting*, XP-002524343, pp. 1560-1564 (2006).

(56) References Cited

OTHER PUBLICATIONS

Daneshvar, M. Reza, et al., "Passive seismic imaging using microearthquakes," *Geophysics*, vol. 60, No. 4, pp. 1178-1186 (Jul.-Aug. 1995).
Artman, Brad, "Imaging passive seismic data," *Geophysics*, vol. 71, No. 4, pp. SI177-SI187, XP-002479903 (Jul.-Aug. 2006).
Castagna, John P., et al., "Instantaneous spectral analysis: Detection of low-frequency shadows associated with hydrocarbons," *The Leading Edge*, XP-002461160, pp. 120-127 (Feb. 2003).
Written Opinion and International Search Report from International Application No. PCT/EP2010/057403 dated Jul. 13, 2011.
Invitation to pay Additional Fees and Partial ISR from International Application No. PCT/EP2011/055140 dated May 30, 2012.
GB Search Report from GB Application No. 1005574.7 dated Jul. 21, 2010.
Bensen et al., Processing Seismic Ambient Noise Data to Obtain reliable Broad-band surface wave dispersion measurements, Jul. 28, 2006-2007. 1239-1260.
Application and File History for U.S. Appl. No. 12/514,963, filed Feb. 1, 2010, inventor Meldahl.
Wood et al., Deceased Stability of Methane Hydrates in Marine Sediments Owing to Phase-Boundry Roughness, Dec. 12, 2002, Nature. vol. 420. pp. 656-660.
Berni, "Remote sensing of seismic vibrations by laser Dopper interferometry" Geophysics. vol. 59, No. 12. pp. 1856-1867. Dec. 1994.
Meldahl et al., Identifying Faults and Gas Chimneyts Using Multiattributes and Neural Networks, May 2001. The Leading Edge, pp. 474-482.
Wood et al., "Decreased Stability of Methane Hydrates in Marine Sediments Owing to Phase-Boundry Roughness" Dec. 12, 2002. Nature, vol. 420. pp. 656-660.
International Search Report—PCT/GB2005/000075 dated Mar. 2, 2006 and GB 0500484.1 dated Apr. 12, 2006.
International Search Report—PCT/GB2007/004348 dated Feb. 27, 2009 and Search Report GB 0622697.1 dated Feb. 16, 2007.
International Search Report—PCT/GB2006/003000 dated Dec. 29, 2006 and Search Report for GB 0516720.0 dated Nov. 8, 2006.
International Search Report—PCT/GB99/03039 dated Jan. 12, 2000.
Preliminary Examination Report—PCT/GB99/03039 dated Oct. 10, 2000.
International Search Report—PCT/GB2008/051223 dated Apr. 29, 2010.
Application and File History of U.S. Patent No. 6,735,526 issued May 11, 2004, Inventors Meldahl et al.
Application and File History of U.S. Patent No. 7,463,549 issued Dec. 9, 2008, Inventors Naess.
Application and File History of U.S. Patent No. 7,660,188 issued Feb. 9, 2010 Inventors Meldahl et al.
Application and File History of U.S. Patent No. 7,720,609 issued May 18, 2010, Inventors Meldahl.
Application and File History of U.S. Publication No. 2009/0128800. Published May 21, 2009. Inventors Meldahl et al.
Application and File History of U.S. Appl. No. 61/321,670, filed Apr. 7, 2010. Inventors Amundsen.
Application and File History of U.S. Appl. No. 12/743,338, filed May 17, 2010. Inventors Torstein.
Application and File History of U.S. Appl. No. 12/789,570, filed May 28, 2010. Inventors Stenevik.
Application and File History of U.S. Appl. No. 12/809,467, filed Jun. 18, 2010. Inventors Bussat.
Application and File History of U.S. Publication No. 2010/0128561 published May 27, 2010 Inventors Meldahl.
Goldstein, Classical Mechanics. 2nd Edition. 1981. p. 164.
Seismic Waves and Earth Oscillations. Downloaded Jun. 29, 2013.
A. V. Gorbatikov et al., "Simulation of the Rayleigh Waves in the Proximity of the Scattering Velocity Heterogeneities. Exploring the Capabilities of the Microseismic Sounding Method," Izvestiya, Physics of the Solid Earth, 2011, pp. 354-369, vol. 47, No. 4, Pleiades Publishing, Ltd.
A. V. Gorbatikov et al, "Microseismic Field Affected by Local Geological Heterogeneities and Microseismic Sounding of the Medium," Izvestiya, Physics of the Solid Earth, 2008, pp. 577-592, vol. 44, No. 7, Pleiades Publishing, Ltd.
Application and File History for U.S. Appl. No. 14/273,052, filed May 8, 2014, inventor Stenevik.
Knopoff et al., "Seismic Reciprocity". Geophysics. vol. 24, No. 4. Oct. 1959.
Application and File History for U.S. Appl. No. 13/861,114, filed, Apr. 3, 2013, inventors Bruun et al.
Application and File History for U.S. Appl. No. 14/313,561, filed Jun. 24, 2014, inventors Amundsen et al.

\* cited by examiner

METHOD OF AND APPARATUS FOR EXPLORING A REGION BELOW A SURFACE OF THE EARTH

PRIORITY CLAIM

The present application is a National Phase entry of PCT Application No. PCT/GB2008/004243, filed Dec. 22, 2008, which claims priority from Great Britain Application No. 0724847.9, filed Dec. 20, 2007, the disclosures of which are hereby incorporated by reference herein in their entirety.

TECHNICAL FIELD

The present invention relates to a method of exploring a region below a surface of the Earth. The present invention also relates to an apparatus for performing such a method, a program for performing data processing of such a method, a computer programmed by such a program, a computer-readable medium containing such a program and transmission across a network of such a program. Such a method may be used, for example, to search for new sources of hydrocarbons and to monitor known hydrocarbon reserves.

BACKGROUND ART

There are various known techniques for exploring the structure and/or composition of regions below the surface of the earth, including below the sea bed. Some of these techniques are "active" in that they require the use of a specific controlled source of energy to probe the region and then measure the effect of the region on the transmitted energy. A typical example of such an active technique is the well-known seismic exploration technique, in which one or more sources produce impulsive or swept-frequency pressure waves which penetrate the earth and the returned pressure variations are measured by geophones or hydrophones.

Figure 1:
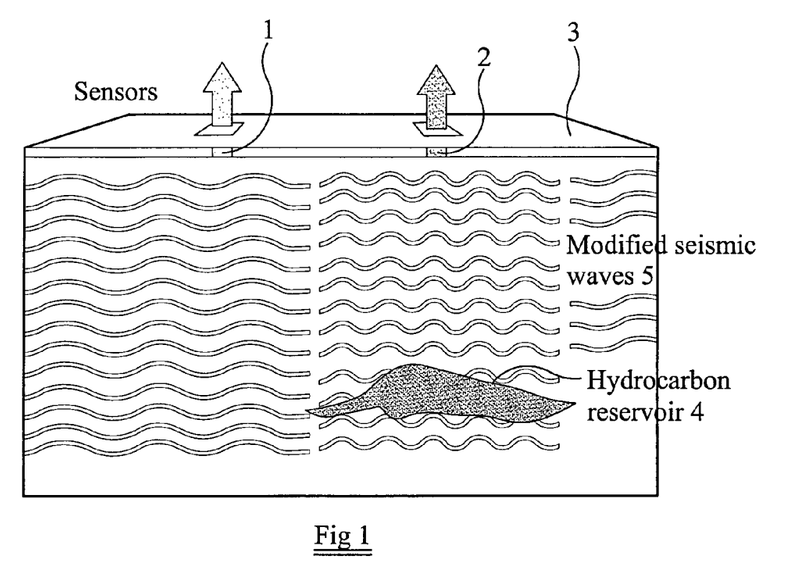
FIG. 1 is a diagrammatic sectional view of a region of the earth illustrating the Hymas technique.

Other techniques are of the "passive" type in that they do not require energy to be produced by a source but, instead, make use of already-existing energy to provide information about the structure or composition below the surface of the earth. One such technique is known as hydrocarbon microtremor analysis (Hymas), for example as disclosed in Dangel et al, 2001, "Phenomenology of tremor-like signals observed over hydrocarbon reservoirs (just related and higher frequencies)". Hymas attempts to measure a continuous signal or tremor in a frequency range between 1 and 10 Hz over the reservoir (not "outside" or "beside" it). As illustrated in FIG. 1 of the accompanying drawings, sensors such as 1 and 2 embedded in the surface 3 of the earth measure such tremors. The sensors 1, 2 are in the form of extremely sensitive seismometers having a sufficiently broad bandwidth to be sensitive to the frequency range of interest. The seismometers are typically arranged as a two-dimensional array or grid with the spacing between seismometers typically being from a few hundred meters to a kilometer, depending on the spatial resolution required. The outputs of the seismometers are recorded for a period of typically 24 hours. It is not necessary for the recordings to be made simultaneously and fewer seismometers may be used by changing their locations after each recording period.

Figure 2:
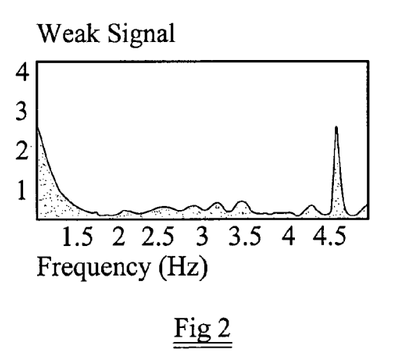
FIGS. 2 and 3 are graphs of amplitude against frequency illustrating the spectra of signals obtained from the Hymas technique of FIG. 1.
Figure 3:
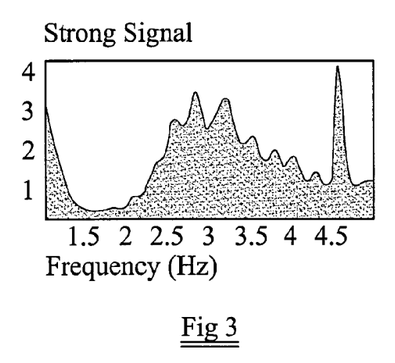

This technique is based on the assumption that a hydrocarbon reservoir 4 interacts with ambient seismic waves to modify the waves in a measurable way. FIGS. 2 and 3 of the accompanying drawings illustrate this. The seismometer 1 is located such that there is no hydrocarbon reservoir in the region of the earth below it. FIG. 2 illustrates the result of analysing the recorded data from the sensor over a recording period of typically 24 hours. The resulting data are plotted as a frequency spectrum of amplitude in arbitrary units against frequency in Hertz (Hz). The seismometer 2 is located above the hydrocarbon reservoir 4 and the spectrum obtained from the recorded data is shown in FIG. 3. It is believed that the presence of significantly increased energy in the frequency band around 3 Hz results from the modified seismic waves 5 produced by the hydrocarbon reservoir 4 and so provides a direct indication of the presence of the hydrocarbon reservoir.

A problem with the Hymas technique is that it is based on the detection and recording of very weak seismic tremor signals. However, human activity provides relatively high amplitude noise in the frequency range investigated in the Hymas technique. For example, noise resulting from vehicles, pumps and drilling occurs in this frequency range and may make the Hymas technique unusable in many situations.

Another known passive technique is referred to as ambient noise tomography (ANT). This technique is based on the use of conventional seismometers which have been recording very low frequency ambient noise for very long periods of time, for example of the order of years. The frequency range of interest is below 0.5 Hz and mainly below 0.05 Hz. Although the seismometers may be spaced apart by hundreds of meters for special cases, they are typically spaced apart by hundreds of kilometers and even globally around the earth. It is necessary for recordings to be made simultaneously and this reveals subsurface information between the locations of pairs of seismometers. An example of this technique is disclosed in Bensen et al, 2007, "Processing seismic ambient noise data to obtain reliable broad-band surface wave dispersion measurements".

The data from such seismometer arrangements are processed so as to extract the Green Function by cross-correlation of two simultaneous recordings. The results for each frequency are then used subjected to a dispersion analysis followed by a tomographic inversion so as to obtain a laminar image. The resolution is such as to provide structural information about the earth on the continental scale. Thus, this technique is generally not of particular interest when looking at smaller regions, for example, when exploring for or monitoring hydrocarbons, because of the insufficient spatial resolution.

Russian Patent no. 2271554C1 discloses a technique for recording and analyzing ambient noise in a frequency range below 15 Hz. In a first phase of this technique, ambient noise is simultaneously recorded ("synchronised") by means of at least three sensors which are sensitive to the vertical component of the ambient noise signal. The data are then analyzed to estimate dispersion curves within the area being investigated.

In the next phase, ambient noise is recorded using at least two synchronised sensors sensitive to the vertical component. One of the sensors is used as a permanent station at the center of the area being surveyed during the whole of the survey. The or each other sensor is moved to different locations within the area being surveyed so as to record the vertical component of the ambient noise at each of the locations for an unspecified time period. The recordings obtained by the non-fixed sensors are then calibrated by calculating the differences between the power spectra of the permanently located sensor and the "moving" sensors. From the estimated dispersion curve, a depth is calculated, in an unspecified way, for each frequency. Maps are then drawn for each frequency or depth of the power spectra differences. Because the sensors are sensitive only to the vertical component of the measured ambient noise, this technique is limited to Rayleigh waves.

SUMMARY OF THE INVENTION

According to a first embodiment of the invention, there is provided a method of exploring a region below a surface of the earth, comprising using a single sensor located in turn at a plurality of locations to obtain seismic data by recording ambient seismic interface waves in a frequency range whose lower limit is greater than or equal to 0 Hz and whose upper limit is less than or equal to substantially 1 Hz, and processing the data to obtain a measure of the energy in a frequency band within the frequency range.

The lower limit may be greater than or equal to one of 0.005 Hz, 0.001 Hz, 0.01 Hz and 0.1 Hz.

The data may be recorded at each location over a predetermined period. The period may be greater than substantially half an hour.

The sensor may be sensitive to three substantially orthogonal components of the ambient seismic interface waves. The method may comprise processing the data to rotate the components so that one of the components is substantially aligned with a direction of arrival of the ambient seismic interface waves. The method may comprise processing the data to obtain the measure of the energy of at least one of Rayleigh, Love and Scholte waves.

The method may comprise selecting for processing a portion of the data obtained at each location in accordance with the energy within the portion. The method may comprise selecting a portion of least energy at each location.

The locations may be spaced apart by at least substantially 100 meters. The locations may be spaced apart by less than substantially five kilometers. The locations may be arranged as a two-dimensional array.

The seismic interface waves may be recorded at or adjacent an interface.

The data may be processed to obtain measures of the energy in a plurality of different frequency bands within the frequency range. The frequency bands may be contiguous or non-overlapping.

The or each frequency band may have a width between 0.001 Hz and 1 Hz.

The frequency band or at least one of the frequency bands may comprise a discrete frequency.

The method may comprise deriving the or each measure of the energy from the amplitudes of the recorded waves in the or the respective frequency band.

The method may comprise deriving the or each measure of the energy from the number of the recorded waves in the or the respective frequency band.

The method may comprise converting the data to the frequency domain. The method may comprise deriving the or each measure of the energy by integrating the converted data over the or the respective frequency band.

The method may comprise normalizing the amplitude of the data. The method may comprise converting the amplitude of the data to one of first and second values according to the sign of the amplitude.

The method may comprise filtering the data to attenuate or remove at least some frequencies outside the or each band.

The method may comprise providing a visualization of the or each measure. The measures may be represented as a map of the region.

According to a second embodiment of the invention, there is provided an apparatus arranged to perform a method according to the first embodiment of the invention.

According to a third embodiment of the invention, there is provided a computer program arranged to control a computer to perform processing in a method according to the first embodiment of the invention.

According to a fourth embodiment of the invention, there is provided a computer containing or programmed by a program according to the third embodiment of the invention.

According to a fifth embodiment of the invention, there is provided a computer-readable medium containing a program according to the third embodiment of the invention.

According to a sixth embodiment of the invention, there is provided transmission across a network of a program according to the third embodiment of the invention.

It is thus possible to provide a technique which may be used to explore a subsurface of the earth in a passive or non-intrusive way. This technique is applicable to a very wide range of locations including onshore and offshore. It may even be possible to use this technique in arctic regions. Further, this technique may be used in protected national parks and the like where it is not possible or not permitted to use active seismic sources.

BRIEF DESCRIPTION OF THE DRAWINGS

The invention will be further described, by way of example, with reference to the accompanying drawings, in which.

DETAILED DESCRIPTION

The present technique records and analyzes ambient seismic noise. Such noise includes all natural signals (main energy below ~0.5 Hz) and all uncontrolled man-made or "anthropogenic" sources (main energy above ~0.5 Hz). Except for some transient seismic signals (e.g. earthquakes, explosions and so on), these ambient noise records look like incoherent motion of the subsurface. These incoherent signals are waves of different types and surface waves are mainly expected within these recordings due to their characteristic properties.

The present technique mainly records and analyzes seismic interface waves (SIW), such as Rayleigh, Love, Scholte waves. In contrast to body waves (longitudinal and shear waves, or in seismology P- and S-waves), which are normally used for hydrocarbon exploration, these SIW propagate along an interface (e.g. the surface or sea bottom). These SIW also have amplitudes and energy below the surface, which are partly higher than their amplitudes directly at the interface. The depth of the highest amplitude depends on the frequency and the propagation velocity of the respective SIW. As a rough rule of thumb, the penetration of SIW increases with decreasing frequency. Active sources usually used for hydrocarbon exploration have their main frequency above 10 Hz (frequency band 1). In this frequency range, the penetration of useable amplitudes of SIW will be less than 10 meters (m). Seismologists are using SIW with frequencies far under 0.1 Hz (frequency band 3) to obtain information on the earth's crust and upper mantle. The present technique uses waves between these two frequency bands (band 2) to derive the information about the subsurface between 0 m and 8000 m depth.

The active excitation of SIW in frequency band 1 is possible with conventional seismic sources (explosion, vibration and so on) or by human noise (e.g. cars, trucks, industry). In band 3, seismologists are using SIW excited by earthquakes. The active excitation of SIW in frequency band 2 is not really possible (except by nuclear explosions). The present technique thus makes use of ambient noise.

In frequency band 2, the SIW are mainly excited by waves and storms on the ocean. It is possible to measure these SIW everywhere in the world (for example as disclosed by Webb 1998: "Broadband seismology and noise under the ocean", in Reviews of Geophysics) and they are usually called "microseisms".

In general, the analysis of amplitudes of recorded seismic signals/waves is very difficult, for example due to the big influence of the individual response function (including the coupling to the earth) of each seismometer. However, these amplitudes contain further or additional information compared with the dispersion of SIW which is normally analyzed by dispersion analysis.

Figure 4:
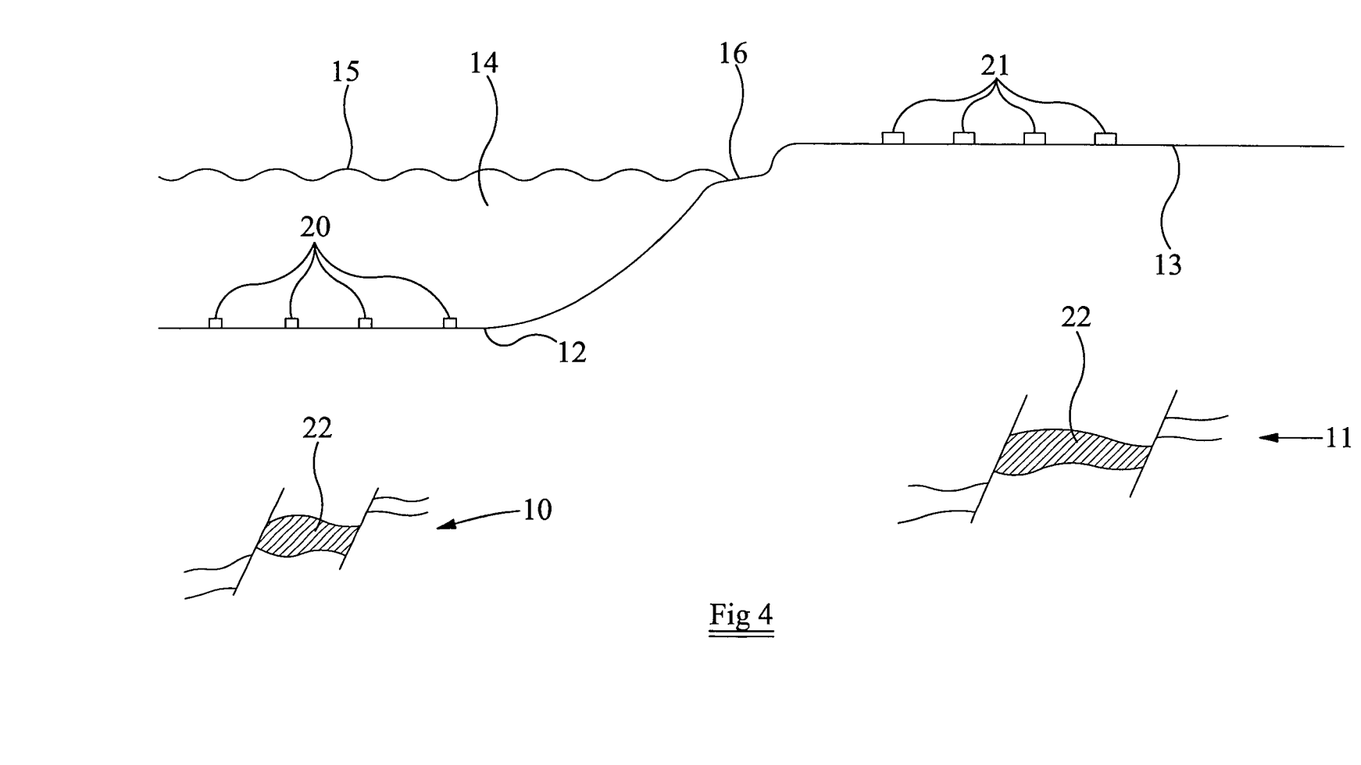
FIG. 4 is a cross-sectional diagram of part of the Earth illustrating data acquisition.

FIG. 4 illustrates a first region of the Earth, indicated generally at 10, and a second region of the Earth, indicated generally at 11, providing examples of regions which may be explored using the present technique. The region 10 is located offshore below the sea bed 12 whereas the region 11 is located onshore below the land surface 13. The sea or ocean is shown at 14 with waves 15 propagating along the surface and breaking on a shore 16.

FIG. 4 illustrates two techniques for recording seismic interface waves in order to explore the two regions 10 and 11. In order to explore the region 10, a single broadband seismometer of sufficient sensitivity is disposed on the sea bed 12 in turn at each of a plurality of locations 20, for example arranged as a grid or array above the region 10. The locations 20 may, for example, be chosen to be a two-dimensional array covering the region 10 and with the spacing between adjacent locations being from approximately 100 meters to approximately 5 kilometers. In particular, the spacing determines the spatial resolution achievable by the present technique as each seismometer location provides data relating to the part of the region generally below the location. Typically a square or rectangular grid of locations is chosen. The seismometer may be sensitive to the vertical component of the seismic interface wave or may also be sensitive to other horizontal components.

The seismometer is selected so as to provide sufficient sensitivity to measure the seismic interface waves in the frequency range of interest, which is below substantially 1 Hz. The lower limit of the range may be chosen according to the depth of the region 10 to be investigated. Frequencies down to 0 Hz may be recorded but a lower limit which may well be acceptable in most situations is thought to be 0.005 Hz. The seismometer must therefore provide sufficient sensitivity throughout this frequency range.

In order to explore the region 11, onshore seismometer locations 21 are arranged as a grid in a similar way. Again a single seismometer is located at each of grid locations in turn.

The regions 10 and 11 are intended to depict structures illustrated at 22 comprising known hydrocarbon reservoirs or prospects for such reservoirs. The present technique may be used, either alone or in combination with other subsurface exploration techniques, to look for new hydrocarbon reservoirs or to monitor existing reservoirs, for example during production or reservoir emptying.

The seismic interface waves are recorded for a predetermined period at each of the locations of the grid. It is believed that a recording time at each location of a few hours will generally be sufficient and it is expected that most locations will allow a recording time of less than 24 hours. It is believed that a recording time of the order of half an hour will be sufficient in some situations.

Although it is possible for the seismic interface waves recorded by the seismometer to be processed in real time during recording, it is more likely that the recordings will be stored for subsequent processing. The seismic data from the seismometer locations are therefore typically converted to the digital domain and stored on any suitable storage medium. The data are subsequently retrieved when convenient and processed so as to analyze the regions 10, 11.

Figure 5:
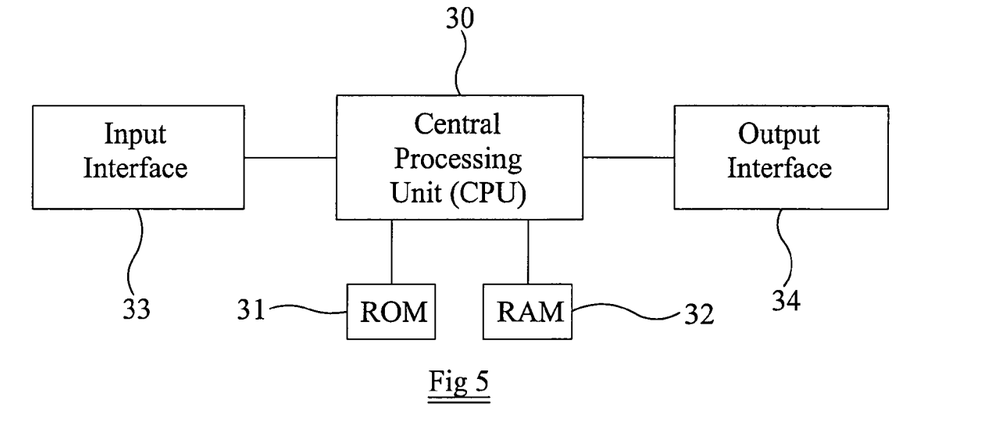
FIG. 5 is a block diagram of a computer for performing processing of acquired data.

The recorded data are processed by an apparatus in the form of a computer, an example of which is illustrated in FIG. 5. The computer comprises a central processing unit (CPU) 30 controlled by a program stored in a read-only memory (ROM) 31. A read/write memory in the form of a random access memory (RAM) 32 is provided for temporary storage of data during processing and, if appropriate, for non-volatile storage of such data, for example including the results of processing. An input interface 33 is provided to allow the data recorded from the seismometer to be entered into the computer and an output interface 34 is provided for supplying the results of the processing. For example, the output interface 34 may provide means for visualizing the results of processing.

Figure 6:
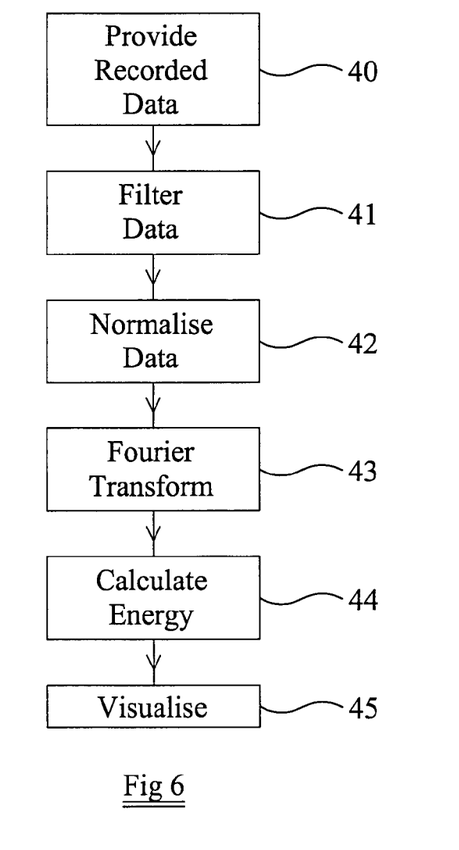
FIG. 6 is a flow diagram illustrating a method constituting an embodiment of the invention.
Figure 7:
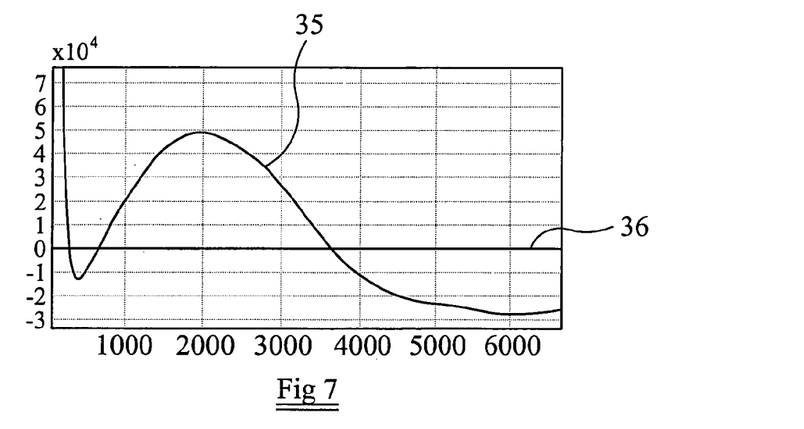
FIG. 7 illustrates the effect of a frequency filtering step of the method of FIG. 6.

FIG. 6 is a flow diagram illustrating the processing performed by the computer shown in FIG. 5. The recorded data are provided at 40, for example by loading the recorded data into the input interface 33. The data are supplied to a filtering step 41, which provides optional filtering of the data. For example, the step 41 may apply a highpass frequency filter with a suitable cut-off frequency, for example of 0.01 Hz, in order to eliminate or attenuate energy outside the frequency range of interest. Such filtering may be used to eliminate or attenuate strong low frequency amplitude variations originating outside the region 10, 11 of interest. FIG. 7 illustrates at 35 the "raw" data recorded at one of the seismometer locations over approximately a 24 hour period. The curve 36 illustrates the result of filtering.

It is also possible to provide bandpass frequency filtering in the step 41 so as to attenuate or eliminate frequencies outside the frequency range of interest. It is further possible to use a bandpass filter to select a band of frequencies or a discrete frequency of particular interest. The filtering step 41 may provide simultaneous or sequential filtering into different frequency bands or discrete frequencies with the subsequent processing being repeated for each frequency band or discrete frequency, for example so as to provide information about the structure and/or composition at different depths within the region 10, 11 as described hereinafter.

The optionally filtered data are then supplied to a normalizing step 42 which, again, is optional and which may be used to provide amplitude normalization of the recorded data. Such normalization may improve the data quality, for example to reduce the effects of amplitude variations resulting from different recording times or from specific artefacts, such as earthquakes.

Figure 8:
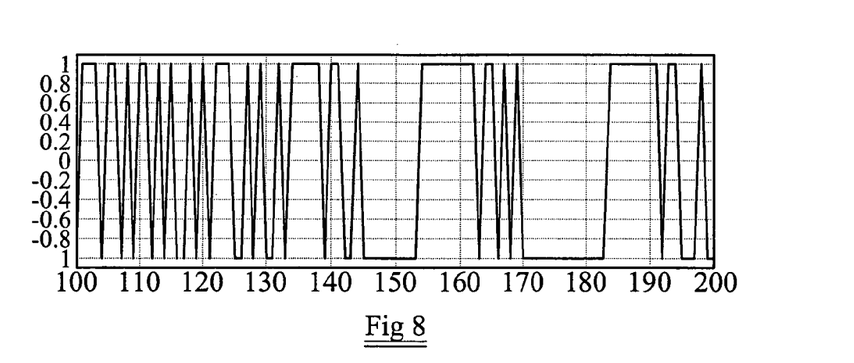
FIG. 8 is waveform diagram illustrating the effect of an amplitude normalization step of the method of FIG. 6.

Various normalization techniques are possible and may be used according to the requirements and according to the quality of the recorded data. For example, in order to remove "strong events" such as earthquakes, amplitude limiting may be applied so as to limit the positive and negative amplitudes to desired thresholds. Any desired degree of limiting may be applied, for example to limit all of the positive and negative peaks in the recorded data to predetermined thresholds. Such normalization may be taken to the limit in the form of "one bit normalization". In such normalization, only the amplitude sign is taken into account so that each peak is limited to either a common positive value or a common negative value according to the sign of the original amplitude. The result of such normalization is illustrated in FIG. 8.

Other, non-limiting, amplitude normalization may be performed. For example, absolute mean normalization may be used.

The time-domain data are then supplied to a step 43, where they are converted to the frequency domain so as to provide amplitude-against-frequency spectrum information. Any suitable transformation may be used and a typical example of such a transformation is a fast Fourier transform. The data in the frequency domain are then supplied to a step 44 for calculating the energy in all or part of the frequency range covered by the data. For example, the amplitude value for one or more specific discrete frequencies may be determined in the step 44. Alternatively or additionally, the step 44 may integrate the amplitude information in the data from the step 43 over one or more frequency bands or windows. For example, the energy at a set of discrete frequencies or found by integrating over a set of contiguous or non-overlapping frequency windows may be calculated by the step 44. As described hereinafter, it is believed that the energy at different frequencies or in different frequency bands provides information more directly related to different depths within the region 10, 11.

The result of the step 44 is the calculation of the energy at a specific frequency or in a specific frequency band at the location of the seismometer which recorded that part of the data. This may represent the amplitude of the seismic interface wave at a discrete frequency or in a frequency window. In the case where one bit normalization has been performed in the step 42, the calculation indicates how often a wave of the specific frequency or of a frequency within the specific band occurs within the recorded data at the location of the seismometer. Both of these "measures" therefore provide a measure of the energy in the seismic interface wave at that frequency or in that band at the location of the seismometer.

The calculated measure of energy may be used directly in order to provide information about the region 10, 11 below the locations 20, 21. However, the results of the step 44 may alternatively or additionally be supplied to an optional visualizing step 45 for providing a visual output, for example in the form of an image on a display and/or a printed hardcopy. This may assist in interpreting the results of the exploration. For example, the values calculated at the same frequency or in the same frequency range for each of the seismometer locations may be displayed as a two-dimensional horizontal map with the individual values being represented at the locations of the seismometer in the horizontal plane.

It is also possible to provide a two-dimensional representation of amplitude plotted against one-dimensional position, for example on the horizontal axis, and frequency or frequency band, for example on the vertical axis. By combining a plurality of such "sectional views" in the orthogonal horizontal spatial direction, a three-dimensional visualisation may be provided. An inversion may be performed to convert frequency to spatial depth so as to provide a two-dimensional or three-dimensional visualisation of the structure or composition of the region 10, 11 below the grid of seismometer locations.

Many visualization tools exist for providing visual representations of subsurface regions. Any suitable tool may be used in the step 45 in order to provide any desired visualisation based on the energy calculations performed in the step 44.

Any type or types of surface interface waves may be recorded in order to perform the present technique. Examples of such waves are Rayleigh waves, Love waves and Scholte waves.

Figure 9:
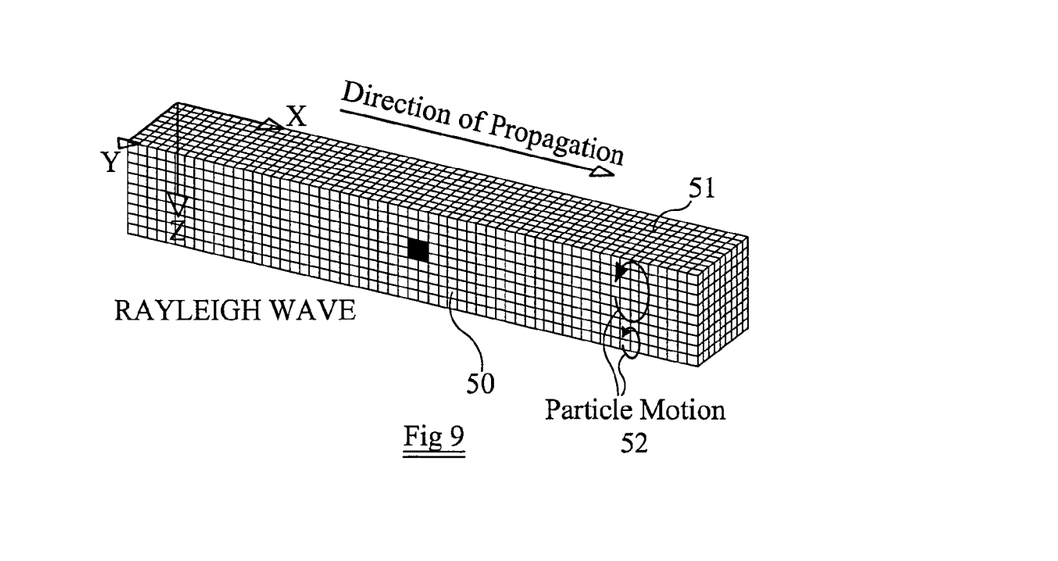
FIG. 9 is a diagram showing particle motion for a Rayleigh wave.

FIG. 9 illustrates the motion of a medium 50 on whose surface 51 a Rayleigh wave is propagating. Cartesian axes are illustrated at X, Y and Z with the wave propagating in the horizontal direction X and the Z axis pointing downwardly into the depth of the medium 50.

The particle motion below the surface when a Rayleigh wave is propagating along the surface 51 is illustrated at 52. Thus, the surface or interface Rayleigh wave is propagated by means of particle motion not just at the surface 51 but also within the medium 50 and each particle repeatedly describes a closed loop.

Figure 10:
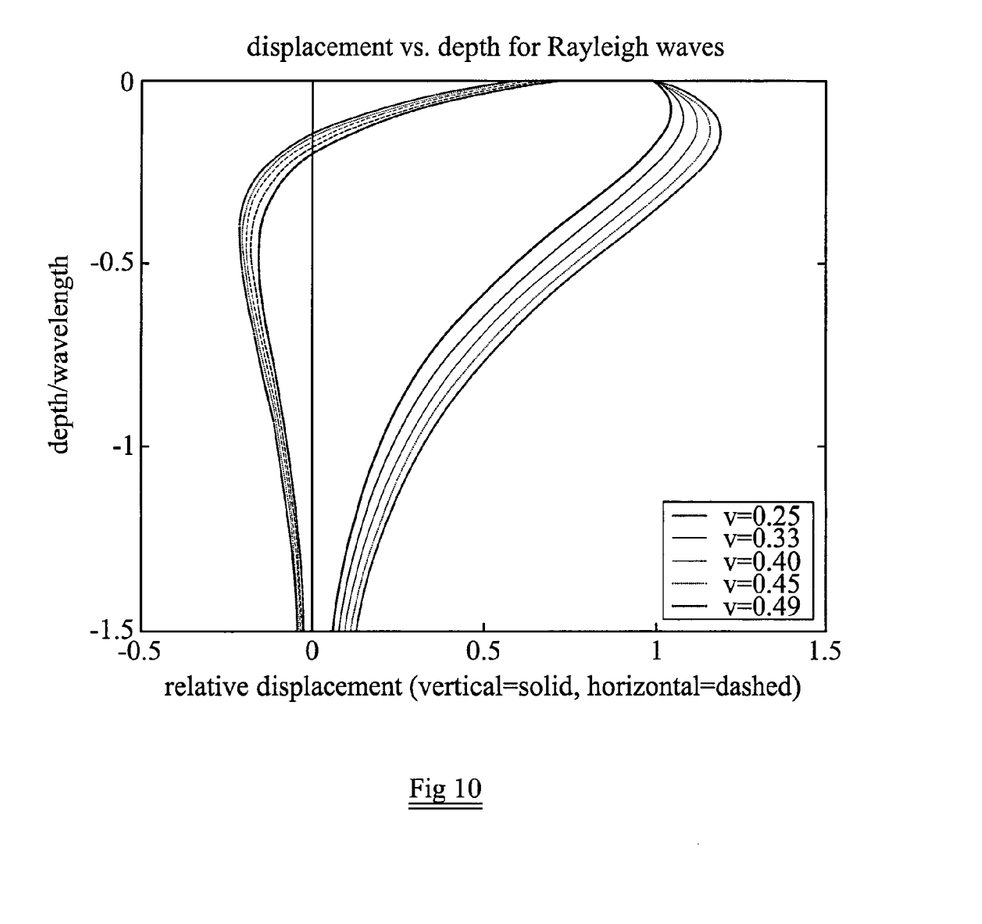
FIG. 10 is a graph of depth in wavelengths against relative displacement in arbitrary units for the vertical and horizontal components of Rayleigh waves.

FIG. 10 illustrates depth in wavelengths against relative maximum displacement of particles for a Rayleigh wave and for different values of v. This illustrates that the maximum displacement or amplitude in the vertical direction does not occur at the surface 51 or other interface but instead occurs at a depth of approximately 0.2 wavelengths below the surface.

Although the mechanism underlying the present technique is not fully understood at present, it is believed that the structure and/or composition of the subsurface region of the earth interacts with Rayleigh or other seismic interface waves in a way which is encoded in the amplitude of such waves at the interface. Further, it is believed that the measurable effect may be largely a function of the maximum particle displacement or amplitude of the medium through which the wave is propagating. Although all depths may have an effect on the wave as measured at the surface, the maximum effect for the vertical component of Rayleigh waves, for example, may largely result from the structure or composition of the earth about 0.2 wavelengths below the surface or other interface. Thus, it is believed that the amplitudes of seismic interface waves such as Rayleigh waves measured at the surface and of different frequencies principally provide information about the structure or composition at different depths below the measurement locations.

It is not yet known which mechanism is affecting the seismic interface waves. However, it is currently believed that one or more of the following mechanisms may be responsible for affecting the measured amplitudes:

Scattering of the surface interface waves;
Different attenuations of the surface interface waves;
The effects of different wave velocities;
The effects of different fluids.

Thus, the amplitudes measured at the interface may relate to the structure below the measurement location, to the nature of the material such as whether the material is solid, water or hydrocarbon, or both.

The following describes various examples of the present technique. For the data acquisition, only one sensor is needed and is sensitive to at least one component. A sensor may be used which is sensitive to three components (for example two horizontal and one vertical). To investigate the Rayleigh wave part of the ambient noise, the vertical component or recording is analyzed. To investigate also the Love wave part and the radial part of the Rayleigh wave, it is necessary to know the main direction of the incident surface waves and a simple rotation of the data to this direction may be applied. This direction is mostly related to storm events in the vicinity (a few hundred or thousand kilometers away). Meteorological observations may provide this information. It is also possible to use the free available data of seismological stations to locate these storms or to identify the main direction.

The sensor is placed at several locations within the surveyed area, for example at least two to see differences between these two locations. The locations for measurements within the surveyed area are preferably on an equidistant grid or otherwise evenly distributed. This is not essential and useful results can also be obtained by irregular survey layouts, which might be chosen e.g. due to topography or prior subsurface information.

The recording time (RT1) for each seismometer is typically a few hours or less. This depends also on the desired penetration. Higher frequencies mean less penetration and less recording length. A short recording time ensures that the general amplitude level of the ambient noise is not changing. In this case, it is possible to compare directly the amplitude spectra of all recordings to see only the difference caused by the subsurface. A calm period may allow a longer time window with stable ambient noise amplitudes.

Another possibility is to record for longer (~days) (RT2) to measure the full variation of ambient noise amplitudes over time. In this case, the quietest time periods may be selected to compare only the spectra of these time intervals. It is assumed that, after each high noise period, there is a calm period which is comparable in amplitude with the previous one.

After the data acquisition is finished, seismometer records are available of different locations over the surveyed area. For each seismometer record, the following steps are applied. Not all are mandatory.

1. Filtering
2. Calculation of FFT/spectrograms
3. Selection of time periods
4. Value calculation In the following, each step is described in more detail. If there are alternatives in the way of processing the data, this is noted. The following steps can be applied to all three components.

1. Filtering: A frequency filter is applied to focus on a specific frequency band.

This could be:
a high pass frequency filter with a cut off frequency of around 0.01 Hz to eliminate strong low frequency amplitude variations;
a band pass filter for a specific frequency band. If a value for a discrete frequency only is to be calculated (see point 4), than a band pass filter may be applied for this frequency:
to obtain values for many frequencies, the processing flow may be repeated with different band pass filters.

2. Fast Fourier Transform FFT to transform the recordings from the time domain into the frequency domain. We can do this for the entire recording (2A) or for shorter times by running windows over the record (2B). In the case of 2B, the window length should be at least a few periods of the investigated wave. This is the calculation of a spectrogram.

3. Selection of time periods (optional but recommend; only in case 2B): The spectrogram allows selection of time periods from the recording; independently if we have the recording length RT1 or RT2. It is possible to select the quietest time period to reduce or eliminate undesirable influences due to transient signals (e.g. earthquakes or other anthropogenic noise) (case RT1) and to be sure that a time period with strongly changing ambient noise amplitudes is not used (case RT2). Selection of time period: There are different methods for selecting data from the calculated spectrogram. Some examples: 1. A time period may be selected where the energy within a defined frequency window is minimal. 2. The amplitudes may be sorted within the spectrogram. This means that, for each frequency, the amplitudes are sorted from low to high. Afterwards, it is possible to select the quietest time periods for each frequency and each time. Finally summing over a time period may be performed to stabilize the data and to obtain only one amplitude spectrum which may be supplied to the next processing step. 3. A further method for the selection of useful time periods can be performed in the time domain before performing the FFT. Thereby the energy may be estimated within every time window (or e.g. calculating the RMS value for such a short time window). Afterwards only the time periods with the lowest energy content are used. 4. Another selection method is described by Groos and Ritter (2008; submitted to Geophysical Journal International) and the Diploma thesis by Joern Groos (2007). The time series is divided into periods of different noise classes. In general is it not necessary to use the quietest time periods. It is only important that the time periods are comparable. By use of other published data (e.g. meteorological) which provides information about the expected noise level for a specific time, it should also be possible to use time periods with a higher noise energy level.

4. Value Calculation: There are some possible methods to calculate a final value for each location:
The simplest way is to use the amplitude value for a specific frequency.
Calculation of an integral of the amplitude spectra over a specific frequency window. This frequency window may be between 0.001 and 1 Hz. The width of the frequency window may be variable and may depend on the data and the desired resolution. The result is one single value for each location.

The following processing steps are only to visualize the results:

I. It is possible to put all the calculated amplitude spectra from the step 3 together to obtain a 2D profile or a 3D cube of the subsurface. In this case, the frequency is used as the depth coordinate. To convert the frequency into depth, it is recommend to compare the observed changes in amplitudes with changes in the geological structure (if available) or to do a rough estimate (e.g. depth=c/f*0.25; with c=propagation velocity and f=frequency)

II. The calculated values of each location from the step 4 may be plotted as a map to visualize the results.

It is thus possible to create an image of the rough reservoir structure. Compared to active seismic, this technique is highly cost-efficient and environmentally friendly, but of lower resolution.

It is possible to produce a rough image of the subsurface with a very inexpenisive method and of relatively good resolution. This technique is independent of the environment, so that it is possible to apply it on mountains, in deep sea, in arctic areas or in protected national parks, where is it not possible or not allowed to use active seismic sources (especially in this frequency band). The technique may provide additional information and may be used in combination with other methods (e.g. ambient noise tomography).

It is believed that a new exploration technique has been provided and may be used in exploration for hydrocarbon reserves or for related functions, such as monitoring production in known hydrocarbon reservoirs. This technique is relatively inexpensive and it may be possible to make use of already existing passive seismic measurements or recordings.

The technique is of the passive type and may be used, it is believed, anywhere in the world. For example, the technique may be used offshore or onshore or even in arctic regions, for example above ice sheets. It may be possible to provide three-dimensional information about the subsurface structure and/or the technique may provide a direct indication of the presence of hydrocarbons.

The invention claimed is:

1. A method of passively exploring a region below a surface of the Earth, comprising;
    using a single sensor located in turn at a plurality of locations to passively obtain seismic data by recording naturally occurring ambient seismic waves in a frequency range whose lower limit is greater than or equal to 0 Hz and whose upper limit is less than or equal to substantially 1 Hz;
    selecting for processing portions of the data obtained at each of the plurality of locations as portions of the data at each location having least amounts of energy;
    processing only the selected data obtained from the ambient seismic waves to remove and/or suppress temporary seismic events; and
    processing only the selected data obtained from the ambient seismic waves at each location to obtain measures of the energy in a plurality of different frequency bands within the frequency range to obtain information for different depths in the region at each location.

2. A method as claimed in claim 1, in which the lower limit is greater than or equal to one of 0.005 Hz, 0.001 Hz, 0.01 Hz and 0.1 Hz.

3. A method as claimed in claim 1, in which the data are recorded at each location over a predetermined period.

4. A method as claimed in claim 3, in which the period is greater than substantially half an hour.

5. A method as claimed in claim 1, in which the sensor is sensitive to three substantially orthogonal components of said ambient seismic waves.

6. A method as claimed in claim 5, comprising processing said data to rotate said components so that any one of the substantially orthogonal components is substantially aligned with a direction of arrival of said ambient seismic waves.

7. A method as claimed in claim 6, comprising processing said data to obtain said measure of said energy of at least one of Rayleigh, Love and Scholte waves.

8. A method as claimed in claim 1, in which said locations are spaced apart by at least substantially 100 meters.

9. A method as claimed in claim 1, in which said locations are spaced apart by less than substantially 5 kilometers.

10. A method as claimed in claim 1, in which said locations are arranged as a two-dimensional array.

11. A method as claimed in claim 1, in which said seismic waves are recorded at or adjacent an interface.

12. A method as claimed in claim 1, in which said frequency bands are contiguous or non-overlapping.

13. A method as claimed in claim 1, in which each said frequency band has a width between 0.001 Hz and 1 Hz.

14. A method as claimed in claim 1, in which said frequency band comprises a discrete frequency.

15. A method as claimed in claim 1, comprising deriving said measure of said energy from amplitudes of said recorded waves in said frequency band.

16. A method as claimed in claim 1, comprising deriving said measure of energy from a number of said recorded waves in said frequency band.

17. A method as claimed in claim 1, comprising converting said data to the frequency domain.

18. A method as claimed in claim 17, comprising deriving said measure of said energy by integrating said converted data over said frequency band.

19. A method as claimed in claim 1, comprising normalizing an amplitude of said data.

20. A method as claimed in claim 19, comprising converting said amplitude of said data to a first value if a sign of the amplitude is positive and a second value if a sign of the amplitude is negative.

21. A method as claimed in claim 1, comprising filtering said data to attenuate at least some frequencies outside said band.

22. A method as claimed in claim 1, comprising providing a visualization of said measure.

23. A method as claimed in claim 22, in which said measure is represented as a map of said region.

24. An apparatus adapted to perform the method of claim 1.

25. A non-transient computer readable medium containing program instructions for causing a computer to perform processing in a method as claimed in claim 1.

26. A computer programmed by a program as claimed in claim 25.

27. A method as claimed in claim 23, wherein the map comprises a three-dimensional visualization with the measures of the energy at each location for each of the frequency bands providing a visualization of depth at each location.

28. A method as claimed in claim 1, wherein the ambient seismic waves are not actively excited as a step in the method.

* * * * *